US012794597B2

(12) United States Patent
Lei

(10) Patent No.: US 12,794,597 B2
(45) Date of Patent: Nov. 10, 2026

(54) METHOD AND APPARATUS FOR RECEIVING PTP-BASED RETRANSMISSION FOR MULTICAST

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 261 days.

(21) Appl. No.: 18/837,766

(22) PCT Filed: Feb. 14, 2022

(86) PCT No.: PCT/CN2022/076203
§ 371 (c)(1),
(2) Date: Aug. 12, 2024

(87) PCT Pub. No.: WO2023/151076
PCT Pub. Date: Aug. 17, 2023

(65) Prior Publication Data
US 2025/0150211 A1 May 8, 2025

(51) Int. Cl.
*H04L 1/1822* (2023.01)
*H04L 1/1829* (2023.01)
(Continued)

(52) U.S. Cl.
CPC .......... *H04L 1/1822* (2013.01); *H04L 1/1854* (2013.01); *H04L 1/1896* (2013.01); *H04W 72/232* (2023.01)

(58) Field of Classification Search
CPC ... H04L 1/1822; H04L 1/1854; H04L 1/1896; H04W 72/232; H04W 4/06
See application file for complete search history.

(56) References Cited

U.S. PATENT DOCUMENTS

2024/0057088 A1* 2/2024 Matsumura ........... H04L 1/1861
2025/0097929 A1* 3/2025 Lee ..................... H04W 72/232

FOREIGN PATENT DOCUMENTS

CN 110199555 A 9/2019
CN 110603765 A 12/2019
(Continued)

OTHER PUBLICATIONS

PCT/CN2022/076203 , "International Search Report and Written Opinion", International Application No. PCT/CN2022/076203, Nov. 14, 2022, 6 pages.

*Primary Examiner* — Angela Widhalm De Rodriguez
(74) *Attorney, Agent, or Firm* — FIG. 1 Patents

(57) ABSTRACT

Embodiments of the present disclosure relate to multicast transmissions and receptions. According to some embodiments of the disclosure, a UE may: receive, from a base station (BS) in a first search space, a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE and the first search space is configured specifically for multicast services; and determine that the first PDSCH carries a transport block (TB) associated with a multicast service.

20 Claims, 7 Drawing Sheets

(51) Int. Cl.
*H04L 1/1867* (2023.01)
*H04W 72/232* (2023.01)

(56) References Cited

FOREIGN PATENT DOCUMENTS

| | | | |
|---|---|---|---|
| CN | 110832900 | A | 2/2020 |
| CN | 112637784 | A | 4/2021 |
| EP | 3537822 | A1 | 9/2019 |
| WO | 2018073792 | A1 | 4/2018 |

* cited by examiner

METHOD AND APPARATUS FOR RECEIVING PTP-BASED RETRANSMISSION FOR MULTICAST

TECHNICAL FIELD

Embodiments of the present disclosure generally relate to wireless communication technology, and more particularly to multicast transmissions and receptions.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

A wireless communication system may support multicast and broadcast services (MBSs). One or more user equipment (UE) may be grouped as an MBS group and may receive multicast transmissions from a base station (BS) via a physical downlink shared channel (PDSCH). The multicast transmissions may be scheduled by downlink control information (DCI). The one or more UEs may transmit hybrid automatic repeat request acknowledgement (HARQ-ACK) feedback corresponding to the PDSCH transmission through a physical uplink control channel (PUCCH) or a physical uplink shared channel (PUSCH). The BS may determine to retransmit the PDSCH in some circumstances.

There is a need for handling HARQ retransmission for a multicast service in a wireless communication system.

SUMMARY

Some embodiments of the present disclosure provide a user equipment (UE). The UE may include a transceiver, and a processor coupled to the transceiver. The processor may be configured to: receive, from a base station (BS) in a first search space, a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE and the first search space is configured specifically for multicast services; and determine that the first PDSCH carries a transport block (TB) associated with a multicast service.

Some embodiments of the present disclosure provide a user equipment (UE). The UE may include a transceiver, and a processor coupled to the transceiver. The processor may be configured to: transmit hybrid automatic repeat request acknowledgement (HARQ-ACK) feedback for a first physical downlink shared channel (PDSCH) scheduled by a first downlink control information (DCI) using a HARQ process number, wherein a cyclic redundancy check (CRC) of the first DCI is scrambled by a first radio network temporary identifier (RNTI) common to a group of UEs including the UE, and wherein the HARQ-ACK feedback indicates ACK feedback, negative ACK (NACK) feedback, or discontinuous transmission (DTX) feedback; and receive a second DCI for scheduling a second PDSCH using the HARQ process number, wherein a CRC of the second DCI is scrambled by a second RNTI specific to the UE; and determine whether the first PDSCH and the second PDSCH carry the same transport block (TB) based at least on the HARQ-ACK feedback.

Some embodiments of the present disclosure provide a user equipment (UE). The UE may include a transceiver, and a processor coupled to the transceiver. The processor may be configured to: receive a first downlink control information (DCI) for scheduling a first physical downlink shared channel (PDSCH) using a first hybrid automatic repeat request (HARQ) process number, wherein a cyclic redundancy check (CRC) of the first DCI is scrambled by a first radio network temporary identifier (RNTI) common to a group of UEs including the UE; receive a second DCI for scheduling a second PDSCH using the first HARQ process number, wherein a CRC of the second DCI is scrambled by a second RNTI specific to the UE and new data indicators (NDIs) of the first DCI and the second DCI are toggled; and determine that the first PDSCH and second PDSCH carry different transport blocks (TBs).

Some embodiments of the present disclosure provide a user equipment (UE). The UE may include a transceiver, and a processor coupled to the transceiver. The processor may be configured to: receive a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE; and in response to the HARQ process number within a set of HARQ process numbers specific for multicast services, determine that the first PDSCH carries a transport block (TB) associated with a multicast service.

Some embodiments of the present disclosure provide a base station (BS). The BS may include a transceiver, and a processor coupled to the transceiver. The processor may be configured to: transmit, to a group of user equipment (UE), a first downlink control information (DCI) in a first search space for transmitting a first transport block (TB) on a first physical downlink shared channel (PDSCH) using a hybrid automatic repeat request (HARQ) process number, wherein a cyclic redundancy check (CRC) of the first DCI is scrambled by a first radio network temporary identifier (RNTI) common to the group of UEs, and the first search space is configured specifically for multicast services and the first TB is associated with a multicast service; determine that the first TB is not correctly received by a first UE of the group of UEs; and transmit, to the first UE, a second DCI in the first search space for retransmitting the first TB on a second PDSCH using the HARQ process number, wherein a CRC of the second DCI is scrambled by a second RNTI specific to the first UE and new data indicator (NDI) in the second DCI is untoggled compared with an NDI in the first DCI.

Some embodiments of the present disclosure provide a base station (BS). The BS may include a transceiver, and a processor coupled to the transceiver. The processor may be configured to: receive, from a user equipment (UE), a hybrid automatic repeat request acknowledgement (HARQ-ACK) feedback for a first physical downlink shared channel (PDSCH) scheduled by a first downlink control information (DCI) using a HARQ process number, wherein a cyclic redundancy check (CRC) of the first DCI is scrambled by a first radio network temporary identifier (RNTI) common to a group of UEs including the UE, and wherein the HARQ- ACK feedback indicates ACK feedback, negative ACK (NACK) feedback, or discontinuous transmission (DTX) feedback; and in response to the HARQ-ACK feedback being the NACK feedback or the DTX feedback, transmit a second DCI for scheduling a second PDSCH using the HARQ process number, wherein a CRC of the second DCI is scrambled by a second RNTI specific to the UE, and the first PDSCH and the second PDSCH carry the same transport block (TB).

Some embodiments of the present disclosure provide a base station (BS). The BS may include a transceiver, and a processor coupled to the transceiver. The processor may be configured to: transmit, to a group of user equipment (UE), a first downlink control information (DCI) for scheduling a first physical downlink shared channel (PDSCH) using a first hybrid automatic repeat request (HARQ) process number, wherein a cyclic redundancy check (CRC) of the first DCI is scrambled by a first radio network temporary identifier (RNTI) common to the group of UEs; transmit, to a UE of the group of UEs, a second DCI for scheduling a second PDSCH using the first HARQ process number, wherein a CRC of the second DCI is scrambled by a second RNTI specific to the UE and new data indicators (NDIs) of the first DCI and the second DCI are toggled; and determine that the first PDSCH and second PDSCH carry different transport blocks (TBs).

Some embodiments of the present disclosure provide a base station (BS). The BS may include a transceiver, and a processor coupled to the transceiver. The processor may be configured to: determine a hybrid automatic repeat request (HARQ) process number for transmitting a transport block (TB) associated with a multicast service, wherein the HARQ process number is determined from a set of HARQ process numbers specific for multicast services; and transmit, to a group of user equipment (UE), a first downlink control information (DCI) for scheduling a first physical downlink shared channel (PDSCH) using the HARQ process number, wherein a cyclic redundancy check (CRC) of the first DCI is scrambled by a first radio network temporary identifier (RNTI) common to the group of UEs.

Some embodiments of the present disclosure provide a base station (BS). The BS may include a transceiver, and a processor coupled to the transceiver. The processor may be configured to: transmit, to a group of user equipment (UE), a downlink control information (DCI) for scheduling a physical downlink shared channel (PDSCH), wherein a cyclic redundancy check (CRC) of the DCI is scrambled by a radio network temporary identifier (RNTI) common to the group of UEs and the PDSCH carries a transport block (TB) associated with a multicast service; and determine to apply either a point-to-multipoint (PTM) based retransmission or a point-to-point (PTP) based retransmission to retransmit the TB.

Some embodiments of the present disclosure provide a method for wireless communication performed by a UE. The method may include: receiving, from a base station (BS) in a first search space, a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE and the first search space is configured specifically for multicast services; and determining that the first PDSCH carries a transport block (TB) associated with a multicast service.

Some embodiments of the present disclosure provide a method for wireless communication performed by a UE. The method may include: transmitting hybrid automatic repeat request acknowledgement (HARQ-ACK) feedback for a first physical downlink shared channel (PDSCH) scheduled by a first downlink control information (DCI) using a HARQ process number, wherein a cyclic redundancy check (CRC) of the first DCI is scrambled by a first radio network temporary identifier (RNTI) common to a group of UEs including the UE, and wherein the HARQ-ACK feedback indicates ACK feedback, negative ACK (NACK) feedback, or discontinuous transmission (DTX) feedback; receiving a second DCI for scheduling a second PDSCH using the HARQ process number, wherein a CRC of the second DCI is scrambled by a second RNTI specific to the UE; and determining whether the first PDSCH and the second PDSCH carry the same transport block (TB) based at least on the HARQ-ACK feedback.

Some embodiments of the present disclosure provide a method for wireless communication performed by a UE. The method may include: receiving a first downlink control information (DCI) for scheduling a first physical downlink shared channel (PDSCH) using a first hybrid automatic repeat request (HARQ) process number, wherein a cyclic redundancy check (CRC) of the first DCI is scrambled by a first radio network temporary identifier (RNTI) common to a group of UEs including the UE; receiving a second DCI for scheduling a second PDSCH using the first HARQ process number, wherein a CRC of the second DCI is scrambled by a second RNTI specific to the UE and new data indicators (NDIs) of the first DCI and the second DCI are toggled; and determining that the first PDSCH and second PDSCH carry different transport blocks (TBs).

Some embodiments of the present disclosure provide a method for wireless communication performed by a UE. The method may include: receiving a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE; and in response to the HARQ process number within a set of HARQ process numbers specific for multicast services, determining that the first PDSCH carries a transport block (TB) associated with a multicast service.

Some embodiments of the present disclosure provide a method for wireless communication performed by a BS. The method may include: transmitting, to a group of user equipment (UE), a first downlink control information (DCI) in a first search space for transmitting a first transport block (TB) on a first physical downlink shared channel (PDSCH) using a hybrid automatic repeat request (HARQ) process number, wherein a cyclic redundancy check (CRC) of the first DCI is scrambled by a first radio network temporary identifier (RNTI) common to the group of UEs, and the first search space is configured specifically for multicast services and the first TB is associated with a multicast service; determining that the first TB is not correctly received by a first UE of the group of UEs; and transmitting, to the first UE, a second DCI in the first search space for retransmitting the first TB on a second PDSCH using the HARQ process number, wherein a CRC of the second DCI is scrambled by a second RNTI specific to the first UE and new data indicator (NDI) in the second DCI is untoggled compared with an NDI in the first DCI.

Some embodiments of the present disclosure provide a method for wireless communication performed by a BS. The method may include: receiving, from a user equipment (UE), a hybrid automatic repeat request acknowledgement (HARQ-ACK) feedback for a first physical downlink shared channel (PDSCH) scheduled by a first downlink control information (DCI) using a HARQ process number, wherein a cyclic redundancy check (CRC) of the first DCI is scrambled by a first radio network temporary identifier (RNTI) common to a group of UEs including the UE, and wherein the HARQ-ACK feedback indicates ACK feedback, negative ACK (NACK) feedback, or discontinuous transmission (DTX) feedback; and in response to the HARQ-ACK feedback being the NACK feedback or the DTX feedback, transmitting a second DCI for scheduling a second PDSCH using the HARQ process number, wherein a CRC of the second DCI is scrambled by a second RNTI specific to the UE, and the first PDSCH and the second PDSCH carry the same transport block (TB).

Some embodiments of the present disclosure provide a method for wireless communication performed by a BS. The method may include: transmitting, to a group of user equipment (UE), a first downlink control information (DCI) for scheduling a first physical downlink shared channel (PDSCH) using a first hybrid automatic repeat request (HARQ) process number, wherein a cyclic redundancy check (CRC) of the first DCI is scrambled by a first radio network temporary identifier (RNTI) common to the group of UEs; transmitting, to a UE of the group of UEs, a second DCI for scheduling a second PDSCH using the first HARQ process number, wherein a CRC of the second DCI is scrambled by a second RNTI specific to the UE and new data indicators (NDIs) of the first DCI and the second DCI are toggled; and determining that the first PDSCH and second PDSCH carry different transport blocks (TBs).

Some embodiments of the present disclosure provide a method for wireless communication performed by a BS. The method may include: determining a hybrid automatic repeat request (HARQ) process number for transmitting a transport block (TB) associated with a multicast service, wherein the HARQ process number is determined from a set of HARQ process numbers specific for multicast services; and transmitting, to a group of user equipment (UE), a first downlink control information (DCI) for scheduling a first physical downlink shared channel (PDSCH) using the HARQ process number, wherein a cyclic redundancy check (CRC) of the first DCI is scrambled by a first radio network temporary identifier (RNTI) common to the group of UEs.

Some embodiments of the present disclosure provide a method for wireless communication performed by a BS. The method may include: transmitting, to a group of user equipment (UE), a downlink control information (DCI) for scheduling a physical downlink shared channel (PDSCH), wherein a cyclic redundancy check (CRC) of the DCI is scrambled by a radio network temporary identifier (RNTI) common to the group of UEs and the PDSCH carries a transport block (TB) associated with a multicast service; and determining to apply either a point-to-multipoint (PTM) based retransmission or a point-to-point (PTP) based retransmission to retransmit the TB.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under a specific network architecture(s) and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
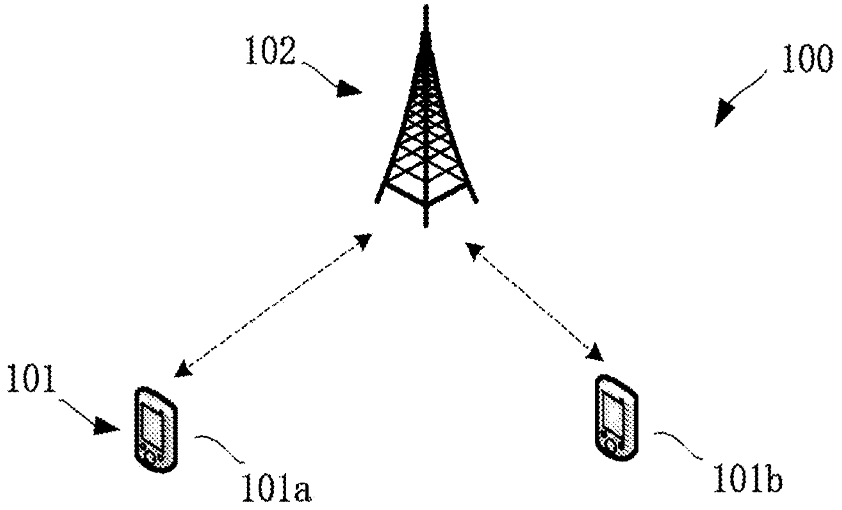
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, a wireless communication system may support multicast and broadcast services (MBSs). For example, one or more UEs (e.g., UE 101*a* and UE 101*b*) may be grouped as an MBS group to receive an MBS(s) (e.g., an MBS PDSCH) from a BS (e.g., BS 102).

Several transmission schemes including, but not limited to, the following three transmission schemes may be applied for multicast transmission: a point-to-point (PTP) scheme, point-to-multipoint (PTM) scheme 1, and PTM scheme 2. A unicast transmission may employ the PTP scheme.

Under the PTP scheme, a UE-specific physical downlink control channel (PDCCH) with a cyclic redundancy check (CRC) scrambled by a UE-specific radio network temporary identifier (RNTI) (e.g., cell-RNTI (C-RNTI)) may be used to schedule a UE-specific PDSCH which is scrambled by the same UE-specific RNTI to a UE. In some examples, the UE may be in a MBS group and the UE-specific PDSCH may carry a TB associated with a corresponding multicast service. In some examples, the UE-specific PDSCH may carry a TB associated with a unicast service.

Under PTM scheme 1, a group-common PDCCH with a CRC scrambled by a group-common RNTI may be used to schedule a group-common PDSCH which is scrambled by the same group-common RNTI to UEs in the same MBS group. This scheme may also be referred to as a group-common PDCCH based group scheduling scheme. The group-common RNTI (e.g., group-RNTI (G-RNTI)) may be configured via RRC signaling. When a UE supports multiple multicast services, each service may be configured with a G-RNTI specific to the service. In other words, from a UE's perspective, the G-RNTIs can be used to differentiate the multiple multicast services.

Under PTM scheme 2, a UE-specific PDCCH with a CRC scrambled by a UE-specific RNTI (e.g., cell-RNTI) may be used to schedule a group-common PDSCH which is scrambled by a group-common RNTI to UEs in the same MBS group. This scheme may also be referred to as a UE-specific PDCCH based group scheduling scheme.

The "group-common PDCCH/PDSCH" may mean that the PDCCH or PDSCH is transmitted in a common time and/or frequency resources, and can be identified by all the UEs in the same MBS group. The "UE-specific PDCCH/PDSCH" may mean that the PDCCH or PDSCH can only be identified by a target UE, but cannot be identified by other UEs.

In the context of the present disclosure, a DCI with a CRC scrambled by a group-common RNTI may hereinafter be referred to as "a group-common DCI" or "a multicast DCI". A DCI with a CRC scrambled by a UE-specific RNTI may hereinafter be referred to as "a UE-specific DCI" or "a unicast DCI". A PDSCH scrambled by a group-common RNTI may hereinafter be referred to as "a group-common PDSCH" or "a multicast PDSCH". A PDSCH scrambled by a UE-specific RNTI may hereinafter be referred to as "a UE-specific PDSCH" or "a unicast PDSCH". A multicast PDSCH may carry a TB associated with a multicast service. A unicast PDSCH may carry a TB associated with a multicast service or a unicast service. A TB associated with a multicast service may hereinafter be referred to as "a multicast TB". A TB associated with a unicast service may hereinafter be referred to as "a unicast TB".

In the context of the present disclosure, a DCI format with a CRC scrambled by a C-RNTI, a configured scheduling RNTI (CS-RNTI) or a modulation coding scheme cell RNTI (MCS-C-RNTI) scheduling a PDSCH reception(s) may be referred to as a unicast DCI format and the PDSCH reception(s) may be referred to as a unicast PDSCH reception(s). A DCI format with a CRC scrambled by a G-RNTI or a G-CS-RNTI scheduling a PDSCH reception(s) may be referred to as a multicast DCI format and the PDSCH reception(s) may be referred to as a multicast PDSCH reception(s). A DCI format with a CRC scrambled by a multicast control channel RNTI (MCCH-RNTI) or a G-RNTI for a multicast traffic channel (MTCH) scheduling a PDSCH reception(s) may be referred to as a broadcast DCI format and the PDSCH reception(s) may be referred to as a broadcast PDSCH reception(s). HARQ-ACK information associated with a multicast DCI format or a multicast PDSCH reception may be referred to as multicast HARQ-ACK information.

DCI format 4_0 may be used for the scheduling of a PDSCH for broadcast in a DL cell and each field size of DCI format 4_0 may be fixed. Zeros shall be appended to DCI format 4_0 until the payload size equals that of DCI format 1_0 monitored in a common search space in the same serving cell. DCI format 4_1 may be used for the scheduling of a PDSCH for multicast in a DL cell and each field size of DCI format 4_1 may be fixed. Zeros shall be appended to DCI format 4_1 until the payload size equals that of DCI format 1_0 monitored in a common search space in the same serving cell. DCI format 4_2 may be used for the scheduling of a PDSCH for multicast in a DL cell and multiple field sizes of DCI format 4_2 may be configurable as a non-fallback DCI. The size of DCI format 4_2 may be configurable by a higher layer parameter(s) from, for example, 20 bits and up to, for example, 140 bits.

In some embodiments of the present disclosure, the same HARQ process ID (or HARQ process number (HPN)) and new date indicator (NDI) may be used for PTM scheme 1 (re)transmissions and PTP retransmissions of the same transport block (TB). The maximum number of HARQ processes per cell, currently supported for unicast, may be kept unchanged for a UE to support multicast reception. Due to the limited HARQ processes (or HPNs), an HPN collision may occur, which may cause some error cases.

In some examples, for a TB to be transmitted via a multicast transmission, if PTM scheme 1 is used for an initial transmission of the TB and ACK/NACK based HARQ-ACK feedback is adopted, a PTP based retransmission, in which the CRC of a DCI is scrambled by a UE-specific RNTI (e.g., C-RNTI), can be used for scheduling the retransmission of the TB, with the same HARQ process ID and an untoggled NDI. Since the NDI in a group-common (GC) PDCCH (GC-PDCCH) (e.g., GC-DCI) is indicated for the group of UEs, such NDI usually cannot be toggled or untoggled for a specific UE within the group. With the assumption of an NDI toggled for a new transmission and untoggled for a retransmission, some error cases may occur when a GC-PDCCH is missed.

Figure 2:
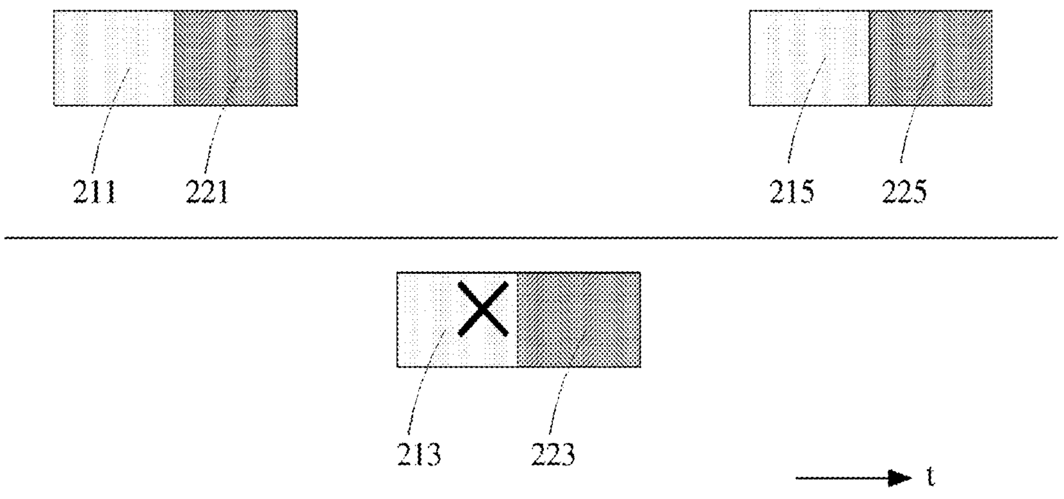
FIGS. 2 and 3 illustrate a schematic diagram of a PTP-based retransmission for an initial PTM transmission in accordance with some embodiments of the present disclosure.

For example, an exemplary error case 1 as described below may occur. Referring to FIG. 2, in some embodiments, a BS may transmit, to a UE, DCI 211 with a CRC scrambled by a UE-specific RNTI (e.g., C-RNTI) to schedule the transmission of TB #A1 on PDSCH 221. DCI 211 may indicate an HPN (e.g., HPN=X1) for TB #A1 on PDSCH 221. The BS may transmit, to a group of UEs including the UE, DCI 213 with a CRC scrambled by a group-common RNTI (e.g., G-RNTI) to schedule an initial transmission of TB #A2 on PDSCH 223. DCI 213 may indicate an HPN having the value of X1 for TB #A2 on PDSCH 223. When DCI 213 is missed by the UE, the UE may report a NACK to the BS. The BS may transmit DCI 215 with a CRC scrambled by a UE-specific RNTI (e.g., C-RNTI) to the UE to schedule the retransmission of TB #A2 on PDSCH 225. DCI 215 may indicate an HPN having the value of X1 for TB #A2 on PDSCH 225. That is, the BS may perform an initial transmission of TB #A2 using PTM scheme 1 and may retransmit TB #A2 using PTP scheme using the same HPN.

In some cases, a misunderstanding on PDSCH 225 may occur. For example, the UE may misunderstand the retransmission of TB #A2 as the retransmission of TB #A1 in view of the same HPN and untoggled NDI (e.g., all of the NDI fields of DCIs 211-215 may indicate the value of “0”). For example, in the case that the UE has reported a NACK to the BS for PDSCH 221, in response to the reception of PDSCH 225, the UE would regard PDSCH 225 as a retransmission of TB #A1 due to the reported NACK from the UE. The UE may combine PDSCH 221 and PDSCH 225, which would result in the corruption of PDSCH 221 in the HARQ buffer. In the case that the UE has reported an ACK to the BS for PDSCH 221, in response to the reception of PDSCH 225, the UE would regard it as a retransmission of TB #A1 due to an ACK to a NACK error at the BS side. The UE may report an ACK to the BS directly, without decoding PDSCH 225, which would result in a loss of TB #A2.

Figure 3:
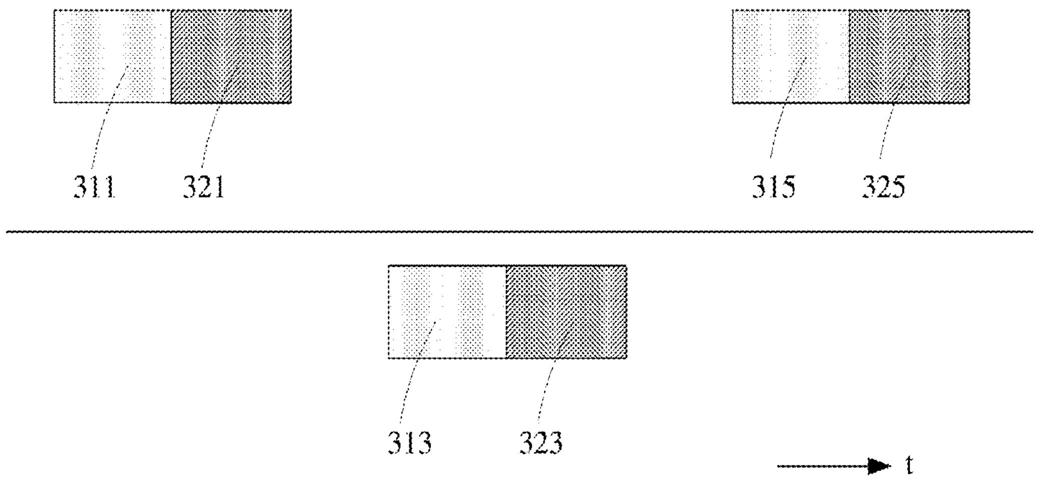

For example, an exemplary error case 2 as described below may occur. Referring to FIG. 3, in some embodiments, a BS may transmit, to a UE, DCI 311 with a CRC scrambled by a UE-specific RNTI (e.g., C-RNTI) to schedule the transmission of TB #B1 on PDSCH 321. DCI 311 may indicate an HPN (e.g., HPN=X2) for TB #B1 on PDSCH 321. The BS may transmit, to a group of UEs including the UE, DCI 313 with a CRC scrambled by a group-common RNTI (e.g., G-RNTI) to schedule an initial transmission of TB #B2 on PDSCH 323. DCI 313 may indicate an HPN having the value of X2 for TB #B2 on PDSCH 323. Assuming that DCI 313 is received by the UE, the UE may report a NACK to the BS (e.g., PDSCH 323 is not correctly decoded by the UE). The BS may transmit DCI 315 with a CRC scrambled by a UE-specific RNTI (e.g., C-RNTI) to the UE to schedule the retransmission of TB #B1 (or the transmission of a new TB such as TB #B3) on PDSCH 325. DCI 315 may indicate an HPN having the value of X2 for PDSCH 325.

In some cases, a misunderstanding on PDSCH 325 may occur. For example, the UE may misunderstand the retransmission of TB #B1 as the retransmission of TB #B2 in view of the same HPN and untoggled NDI (e.g., all of the NDI fields of DCIs 311-315 may indicate the value of “0”). The UE may combine PDSCH 323 and PDSCH 325, which would result in the corruption of PDSCH 323 in the HARQ buffer.

Embodiments of the present disclosure provide solutions to solve the above issues. For example, solutions for avoiding or alleviating the HPN collision are proposed. For example, solutions for solving a retransmission misunderstanding are proposed. More details on the embodiments of the present disclosure will be illustrated in the following text in combination with the appended drawings.

In some embodiments of the present disclosure, a common search space (CSS) may be defined for a transmission(s) of a multicast service(s). For simplicity, this CSS is hereinafter referred to as “multicast CSS”. The multicast CSS may be different from known CSSs such as CSS type 0, CSS type OA, CSS type 1, CSS type 2, and CSS type 3 and a UE-specific search space(s) which can be used for transmitting a unicast DCI(s), i.e., a UE-specific DCI(s). A BS may configure the multicast CSS to a group of UEs for monitoring a DCI(s) scheduling a transmission(s) and retransmission(s) of a multicast service(s).

In some examples, for an initial transmission and possible subsequent retransmission of a TB associated with a unicast service on a unicast PDSCH in a PTP manner, the UE-specific DCI scheduling the initial transmission of the TB and the UE-specific DCI scheduling the retransmission (if any) of the TB may be transmitted in a UE-specific search space (USS).

In some examples, a multicast DCI may be transmitted only in the multicast CSS, that is, not transmitted in the above known CSSs or a USS. For example, for an initial transmission of a TB associated with a multicast service on a multicast PDSCH in the PTM manner, the multicast DCI scheduling the initial transmission of the TB may be only transmitted in the multicast CSS. For example, if the TB is retransmitted in a PTM manner, the multicast DCI scheduling the retransmission of the TB may be transmitted only in the multicast CSS. In some examples, if the TB is retransmitted in a PTP manner, e.g., on a unicast PDSCH scheduled by a UE-specific DCI, the UE-specific DCI is transmitted only in the multicast CSS. In other words, when a PTP-based retransmission is used for retransmitting a TB which is initially transmitted in a PTM manner, the UE-specific DCI for scheduling the PTP-based retransmission may be transmitted only in the multicast CSS which is the same as the previous multicast DCI scheduling the initial transmission of the TB in the PTM manner.

From a UE's perspective, if the UE receives a UE-specific DCI (current UE-specific DCI) scheduling a UE-specific PDSCH in the multicast CSS, the UE may determine that the scheduled UE-specific PDSCH is for retransmission of a TB carried on a multicast PDSCH which is initially scheduled by a multicast DCI in the multicast CSS. The UE may perform a soft combination between the UE-specific PDSCH and the multicast PDSCH. The UE may not perform a soft combination between the UE-specific PDSCH (e.g., PDSCH 225) scheduled by the current UE-specific DCI in the multicast CSS and a UE-specific PDSCH (e.g., PDSCH 221) scheduled by a previous UE-specific DCI in a USS.

A UE does not expect a UE-specific DCI transmitted in the multicast CSS for scheduling a UE-specific PDSCH carrying a TB which is not initially transmitted on a multicast PDSCH scheduled by a multicast DCI in the multicast CSS in a PTM manner. In other words, a UE may assume that a UE-specific DCI received in the multicast CSS is used for scheduling a UE-specific PDSCH carrying retransmission of a TB which is initially transmitted on a multicast PDSCH scheduled by a multicast DCI in the multicast CSS in a PTM manner.

At a BS side, when a TB is initially transmitted on a multicast PDSCH which is scheduled by a multicast DCI in the multicast CSS, if the BS adopts a PTP-based retransmission for retransmitting the TB to a UE, the BS may transmit a UE-specific DCI in the multicast CSS for scheduling a unicast PDSCH carrying the TB with the same HARQ process number as the previous multicast DCI (i.e., the multicast DCI scheduling the initial transmission of the TB) and a non-toggled NDI compared with an NDI in the previous multicast DCI.

At the UE side, when the previous multicast DCI is missed by the UE and a UE-specific DCI (current UE-specific DCI) is received in the multicast CSS, in view of the received UE-specific DCIs in different search spaces (SSs) (e.g., the current UE-specific DCI is received in the multicast CSS and a previous UE-specific DCI is received in the USS), regardless of whether the NDI in the current UE-specific DCI toggled or non-toggled compared with the NDI in the previous UE-specific DCI, the UE may determine that the two UE-specific DCIs schedule two different TBs and may not perform a soft combination between the PDSCH scheduled by the previous UE-specific DCI in the USS and the PDSCH scheduled by the current UE-specific DCI in the multicast CSS.

When the previous multicast DCI is received in the multicast CSS by the UE and a UE-specific DCI (current UE-specific DCI) is further received in the multicast CSS, in view of the current UE-specific DCI and the previous multicast DCI received in the same SS and the same HARQ process number indicated, in the case that the NDI in the current UE-specific DCI is untoggled compared with the NDI in the previous multicast DCI, the UE may determine that the current UE-specific DCI schedules a retransmission of a TB which is initially scheduled by the previous multicast DCI in the multicast CSS. The UE may perform a soft combination between the PDSCH scheduled by the previous multicast DCI in the multicast CSS and the PDSCH scheduled by the current UE-specific DCI in the multicast CSS. In the case that the NDI in the current UE-specific DCI is toggled compared with the NDI in the previous multicast DCI, the UE may regard this as an error case. In other words, the UE does not expect a UE-specific DCI transmitted in the multicast CSS for scheduling a UE-specific PDSCH carrying a TB which is not initially transmitted on a multicast PDSCH scheduled by a multicast DCI in the multicast CSS in a PTM manner. That is, the UE may assume that a UE-specific DCI received in the multicast CSS is used for scheduling a UE-specific PDSCH carrying retransmission of a TB which is initially transmitted on a multicast PDSCH scheduled by a multicast DCI in the multicast CSS in a PTM manner.

For example, referring back to FIG. 2, according to the above embodiments, a BS may transmit DCI 211 to a UE in a USS with the CRC scrambled by a C-RNTI to schedule the transmission of TB #A1 on PDSCH 221. The BS may transmit, to a group of UEs including the UE in a multicast CSS, DCI 213 with the CRC scrambled by a G-RNTI to schedule an initial transmission of TB #A2 on PDSCH 223.

DCI 213 may be missed by the UE. In some examples, the UE may report a NACK for PDSCH 223, for example, in the case that HARQ-ACK feedback for PDSCH 223 is multiplexed with other HARQ-ACK feedback. In some examples, the UE may not report any feedback for PDSCH 223, for example, in the case that HARQ-ACK feedback for PDSCH 223 is not multiplexed with other HARQ-ACK feedback. In response to receiving the NACK feedback or nothing for PDSCH 223, the BS may transmit DCI 215 in the multicast CSS for scheduling retransmission of TB #A2 in a PTP manner with an untoggled NDI compared with the NDI in DCI 213 and the same HPN as that in DCI 213.

Since DCI 211 and DCI 215 are received in different SSs, the UE may know that DCI 211 and DCI 215 schedule two different TBs and may not perform a soft combination between PDSCH 221 and PDSCH 225. The UE may determine that DCI 215 schedules the retransmission of a previous multicast TB (e.g., TB #A2) in a PTM manner.

In some examples, assuming that the UE receives DCI 213 in the multicast CSS but fails to decode PDSCH 223, the UE may also report a NACK for PDSCH 223 to the BS. In response to receiving the NACK feedback for PDSCH 223, the BS may transmit DCI 215 in the multicast CSS for scheduling retransmission of TB #A2 in a PTP manner with an untoggled NDI compared with the NDI in DCI 213. As stated above, since DCI 211 and DCI 215 are received in different SSs, the UE may determine that DCI 211 and DCI 215 schedule two different TBs and may not perform a soft combination between PDSCH 221 and PDSCH 225. The UE may determine that DCI 215 schedules the retransmission of a previous multicast TB in a PTM manner. Furthermore, since DCI 213 and DCI 215 are received in the multicast CSS and the NDIs in DCI 213 and DCI 215 are untoggled, the UE may determine that DCI 213 and DCI 215 schedule the same TB and PDSCH 225 carries a retransmission of PDSCH 223. The UE may perform a soft combination between PDSCH 223 and PDSCH 225.

In some embodiments of the present disclosure, a maximum of three HARQ-ACK feedback states may be employed for a UE to report the decoding and reception statuses of a multicast TB carried on a multicast PDSCH which is scheduled by a group-common DCI with a CRC scrambled by a G-RNTI.

For example, the three HARQ-ACK feedback states may include the following:

- in the case that the multicast PDSCH or the multicast TB is received and correctly decoded, ACK feedback is reported;
- in the case that the multicast PDSCH or the multicast TB is received while not correctly decoded, NACK feedback is reported; and
- in the case that the multicast PDSCH or the multicast TB is not received (e.g., the corresponding DCI is missed), DTX feedback is reported.

The HARQ-ACK feedback may be carried on a PUCCH which can adopt various PUCCH formats. For example, for HARQ-ACK feedback carried on a PUCCH format (e.g., PUCCH format 0) based on sequence selection, a maximum of three sequences may be configured (or predefined) to the UE for the maximum of three HARQ-ACK feedback states, respectively. For HARQ-ACK feedback carried on other types of PUCCH format (e.g., PUCCH format 1), two bits may be enough to report one of the maximum of three HARQ-ACK feedback states. For example, "00" may represent ACK, "01" may represent NACK, "10" may represent DTX and "11" may be reserved. When the HARQ-ACK feedback for the multicast PDSCH is to be multiplexed with HARQ-ACK feedback for a unicast PDSCH(s) or other multicast PDSCH(s), two bits may be generated for the multicast PDSCH (e.g., "00" may represent ACK, "01" may represent NACK, "10" may represent DTX and "11" may be reserved) so as to differentiate ACK, NACK and DTX for the multicast PDSCH.

At a BS side, in response to the reception of the DTX feedback, the BS would know that the UE missed the group-common DCI. In some examples, the BS may retransmit the group-common DCI for scheduling the multicast TB in a PTM manner. In some examples, the BS may transmit a UE-specific DCI (current UE-specific DCI) for scheduling the multicast TB in a PTP manner. The NDI of the current UE-specific DCI may be toggled compared to that in a previous UE-specific DCI to the UE with the same HARQ process number as the current UE-specific DCI.

At the UE side, when the UE transmits the DTX feedback for a multicast TB (previous multicast TB) and further receives a UE-specific DCI (current UE-specific DCI) for scheduling a UE-specific PDSCH with the same HARQ process number as that in a previous UE-specific DCI for scheduling a previous unicast PDSCH, if the NDI in the current UE-specific DCI is toggled compared with the NDI in the previous UE-specific DCI, the UE may determine that the current UE-specific DCI schedules the retransmission of the previous multicast TB in a PTP manner. The UE may not perform a soft combination between the previous UE-specific PDSCH and the current UE-specific PDSCH (scheduled by the current UE-specific DCI). If the NDI in the current UE-specific DCI is untoggled compared with the NDI in the previous UE-specific DCI, the UE may regard this as an error case. That is, the UE may not expect to receive a UE-specific DCI for scheduling a UE-specific PDSCH with an NDI untoggled compared to that in a previous UE-specific DCI with the same HARQ process number if the HARQ-ACK feedback for the previous multicast TB is the DTX feedback.

At the BS side, in response to the reception of the NACK feedback, the BS would know that the UE has received the group-common DCI (previous group-common DCI). In some examples, the BS may retransmit the group-common DCI for scheduling the multicast TB in a PTM manner. In some examples, the BS may transmit a UE-specific DCI (current UE-specific DCI) for scheduling the multicast TB in a PTP manner. The NDI of the current UE-specific DCI may be untoggled compared to that in the previous group-common DCI with the same HARQ process number as the current UE-specific DCI.

At the UE side, when the UE transmits the NACK feedback for the multicast TB (previous multicast TB) and further receives a UE-specific DCI for scheduling a UE-specific PDSCH with the same HARQ process number as the previous group-common DCI (which schedules the previous multicast TB), if the NDI in the UE-specific DCI is untoggled compared with the NDI in the previous group-common DCI, the UE may determine that this UE-specific DCI schedules the retransmission of the multicast TB in a PTP manner. The UE may perform a soft combination between the previous group-common PDSCH carrying the previous multicast TB and the UE-specific PDSCH. If the NDI in the UE-specific DCI is toggled compared with the NDI in the previous group-common DCI, the UE may regard this as an error case. That is, the UE may not expect to receive a UE-specific DCI for scheduling a UE-specific PDSCH with an NDI toggled compared to that in a previous group-common DCI with the same HARQ process number if the HARQ-ACK feedback for the previous multicast TB is the NACK feedback.

For example, referring back to FIG. 2, according to the above embodiments, a BS may transmit, to a UE, DCI 211 with a CRC scrambled by a C-RNTI to schedule the transmission of TB #A1 on PDSCH 221. DCI 211 may indicate an HPN having the value of X1 for TB #A1 on PDSCH 221. The BS may transmit, to a group of UEs including the UE, DCI 213 with a CRC scrambled by a G-RNTI to schedule an initial transmission of TB #A2 on PDSCH 223. In some examples, DCI 213 may indicate an HPN having the value of X1 for TB #A2 on PDSCH 223.

In the case that the UE misses PDSCH 223 (e.g., due to the miss of DCI 213), the UE may report DTX feedback for PDSCH 223 to the BS. In response to the reception of the DTX feedback, the BS may transmit DCI 215 with a CRC scrambled by the C-RNTI to the UE to schedule the retransmission of TB #A2 on PDSCH 225. DCI 215 may indicate the same HPN (e.g., X1) as that in DCI 213 and an NDI toggled compared with the NDI in DCI 211. Due to the miss of DCI 213, the UE would not know the NDI status or the HARQ process number in DCI 213. By comparing the NDIs in DCI 211 and DCI 215, the UE may determine that DCI 215 schedules a different TB from TB #A1 and may not perform a soft combination between PDSCH 221 and PDSCH 225. The UE may determine that DCI 215 schedules a retransmission of the previous multicast TB (e.g., TB #A2) in a PTP manner.

In the case that the UE receives PDSCH 223 but fails to decode it, the UE may report NACK feedback for PDSCH 223 to the BS. In response to the reception of the NACK feedback, the BS may transmit DCI 215 with a CRC scrambled by the C-RNTI to the UE to schedule the retransmission of TB #A2 on PDSCH 225. DCI 215 may indicate the same HPN (e.g., X1) as that in DCI 213 and an NDI untoggled compared with the NDI in DCI 213. Since DCI 213 is received by the UE, the UE would know the NDI status or the HARQ process number in DCI 213. By comparing the NDIs in DCI 213 and DCI 215, the UE may determine that DCI 215 schedules a retransmission of the previous multicast TB (e.g., TB #A2) in a PTP manner. For example, the UE may determine that DCI 215 schedules the same TB as TB #A2. The UE may perform a soft combination between PDSCH 223 and PDSCH 225.

In this way, the UE can identify whether a currently received UE-specific DCI with a CRC scrambled by the UE-specific RNTI schedules a retransmission of a multicast TB in a previous multicast transmission or a unicast TB in a previous unicast transmission.

In some embodiments of the present disclosure, for a UE receiving a multicast service and supporting a PTP-based retransmission for a PTM-based initial transmission, the same HPN is applied. A BS may determine whether to apply a PTM-based retransmission or a PTP-based retransmission for the PTM-based initial transmission based on certain criteria.

For example, a BS may transmit a group-common PDSCH scheduled by a group-common DCI with a CRC scrambled by a G-RNTI to a group of UEs. The group-common PDSCH may carry a multicast TB. A UE in the group of UEs may transmit a corresponding HARQ-ACK feedback (e.g., ACK or NACK) for the group-common PDSCH to the BS. The BS may determine that at least one UE in the group of UEs fails to receive or decode the group-common PDSCH or the multicast TB and may determine to retransmit the multicast TB. The BS may determine whether to apply the PTM-based retransmission or the PTP-based retransmission based on certain criteria.

For example, the BS may apply the PTM-based retransmission by retransmitting the group-common DCI, which schedules another group-common PDSCH carrying the retransmission of the multicast TB. For example, the BS may apply the PTP-based retransmission by transmitting a UE-specific DCI, which schedules a UE-specific PDSCH carrying the retransmission of the multicast TB. In some examples, the retransmission of the multicast TB may be performed one or more times until the UE correctly decode the multicast TB.

In some examples, PTM-based retransmission may be applied when at least one of the below rules is satisfied:

if the transmission time of the group-common DCI is less than or equal to a maximum transmission time, wherein the maximum transmission time may be determined by the BS according to a criterion or predefined, for example, in a standard(s); or if the ratio of the number of UEs in the group of UEs which report the NACK feedback to the total number of UEs in the group of UEs exceeds a threshold in the case of UE-specific ACK/NACK feedback is configured for the PDSCH, wherein the threshold may be determined by the BS according to a criterion or predefined, for example, in a standard(s); or at least one UE in the group of UEs reports the NACK feedback in the case of NACK-only feedback is configured for the PDSCH; or at least one UE in the group of UEs has an associated DCI with a CRC scrambled by a UE-specific RNTI which schedules a UE-specific PDSCH and indicates an NDI untoggled compared with the NDI in the group-common DCI.

In some examples, PTP-based retransmission may be applied when at least one of below rules is satisfied:

If the transmission time of the group-common DCI is greater than a maximum transmission time, wherein the maximum transmission time may be determined by the BS according to a criterion or predefined, for example, in a standard(s); or if the ratio of the number of UEs in the group of UEs which report the NACK feedback to the total number of UEs in the group of UEs does not exceed a threshold in the case of UE-specific ACK/NACK feedback is configured for the PDSCH, wherein the threshold may be determined by the BS according to a criterion or predefined, for example, in a standard(s); or no UE in the group of UEs has an associated DCI with a CRC-scrambled by a UE-specific RNTI which schedules a UE-specific PDSCH and indicates an NDI untoggled compared with the NDI in the group-common DCI.

In this way, the retransmission misunderstanding can be avoided.

In some embodiments of the present disclosure, HARQ process overbooking may be allowed to avoid or alleviate HPN collision, for example, when the number of HARQ processes of a UE is not enough for multicast and unicast transmissions. For example, the BS may transmit DCIs with the same HPN and toggled NDIs to schedule different TBs in a PTM scheme. The BS may retransmit a DCI to scheduling the retransmission of a multicast TB in a PTP scheme, wherein the DCI may indicate the same HPN and untoggled NDIs compared with the DCI for the initial transmission of multicast TB in a PTM scheme.

For example, it is assumed that an initial transmission of a multicast TB uses PTM scheme 1 and the group-common DCI (group-common DCI #1) for scheduling the multicast TB (multicast TB #1) uses HPNx. For a UE which reports the NACK feedback or no feedback for multicast TB #1, the BS may retransmit multicast TB #1 according to a PTP scheme to the UE using HPN x. For example, the BS may transmit a UE-specific DCI with HPN x to schedule a UE-specific PDSCH carrying the retransmission of multicast TB #1 to the UE. The BS may also transmit a new group-common DCI (group-common DCI #2) with a CRC scrambled by G-RNTI and with HPN x for scheduling an initial transmission of a new multicast TB (multicast TB #2). The NDI in group-common DCI #2 is toggled compared to that in group-common DCI #1 so that a member UE(s) which has successfully decoded the multicast TB #1 can clear the soft buffer for this HARQ process (i.e., HPN x) and receive multicast TB #2.

For the UE which receives the UE-specific DCI for scheduling the retransmission of multicast TB #1 and group-common DCI #2 for scheduling an initial transmission of multicast TB #2 with the same HPN, various methods may be applied to handle the retransmission of multicast TB #1 and multicast TB #2. In some examples, the UE may store the retransmitted multicast TB #1 (or the corresponding PDSCH) in a HARQ process having an HPN of x and then decode it. Storing a TB in a HARQ process may mean storing the TB in a buffer associated with the HARQ process or the corresponding HPN. The UE may store the new multicast TB #2 (or the corresponding PDSCH) in a HARQ process having an HPN different to x and then decode it. Or the UE may drop the new multicast TB #2 (or the corresponding PDSCH). The UE may further transmit the NACK feedback for the PDSCH carrying the new multicast TB #2 in response to dropping the new multicast TB #2.

In some examples, the UE may store the new multicast TB #2 (or the corresponding PDSCH) in the HARQ process having an HPN of x and then decode it. The UE may store the retransmitted multicast TB #1 (or the corresponding PDSCH) in a HARQ process having an HPN different to x and then decode it. Or the UE may drop the retransmitted multicast TB #1 (or the corresponding PDSCH). The UE may further transmit the NACK feedback for the PDSCH carrying the retransmitted multicast TB #1 in response to dropping the retransmitted multicast TB #1.

In some examples, the UE may decode one of the retransmitted multicast TB #1 and the new multicast TB #2 (or the corresponding PDSCHs) according a predefined rule, for instance, based on the priorities associated with the respective TBs or PDSCHs. For example, the UE may decode the one associated with a higher priority. The priority of a TB or PDSCH carrying the TB may be indicated in the scheduling DCI. When the retransmitted multicast TB #1 and the new multicast TB #2 have the same priority, the UE may decode the retransmitted multicast TB #1 and drop the new multicast TB #2. Alternative, the UE may drop the retransmitted multicast TB #1 and decode the new multicast TB #2. The UE may further transmit NACK feedback for the dropped TB.

In some embodiments of the present disclosure, a plurality of HARQ processes (e.g., a total of N HARQ processes, which correspond to N HPNs) may be configured for a UE per serving cell. A subset of the plurality of HARQ processes (e.g., M HARQ processes, which correspond to M HPNs) may be specified for the multicast services. The subset of HARQ processes or HPNs may be configured to a UE via for example, RRC signaling or predefined in a standard(s). For a DCI scheduling a multicast TB either initially transmitted in a PTM manner or retransmitted in a PTM or a PTP manner, the DCI (either a group-common DCI or a UE-specific DCI) may indicate a HPN from the subset. The remaining (e.g., N-M) HARQ processes may be for a unicast service.

Since both a multicast TB and a unicast TB can be carried in a unicast PDSCH transmission, a unicast PDSCH transmission may be associated with the plurality of HARQ processes. Accordingly, a DCI with a CRC scrambled by a UE-specific RNTI (e.g., C-RNTI) for scheduling a unicast PDSCH transmission may include at least $\lceil \log_2 N \rceil$ bits for indicating the HARQ process number from the plurality of HARQ processes. A DCI with a CRC scrambled by a group-common RNTI (e.g., G-RNTI) in a PTM scheme may include at least $\lceil \log_2 M \rceil$ bits for indicating the HARQ process number for a MBS service (e.g., from the subset of HARQ processes). The group-common DCI may schedule an initial transmission or a retransmission of a multicast TB, which may be carried by a multicast PDSCH or a unicast PDSCH. In the case that a PTM scheme is used for an initial transmission and a PTP or PTM scheme is used for the retransmission, the same HARQ process number should be used. This also explains the reason why at least $\lceil \log_2 N \rceil$ bits are required for indicating the HARQ process number in a UE-specific DCI.

For example, it is assumed that a total of N=16 HARQ processes are configured, the first 12 HARQ processes are used for unicast transmission and the remaining 4 HARQ processes are used for multicast transmission. For a DCI with a CRC scrambled by a group-common RNTI (e.g., G-RNTI) for scheduling transmission in a PTM scheme, at least 2 bits are required for indicating one of the 4 HARQ process numbers. For a DCI with a CRC scrambled by a C-RNTI, at least 4 bits are required for indicating one of the 16 HARQ process numbers, which can schedule, for example, a unicast transmission or a PTP-based retransmission for an initial PTM transmission.

Compared to a DCI (e.g., DCI 213 in FIG. 2) with a CRC scrambled by the G-RNTI for scheduling an initial PTM transmission, the same HPN (e.g., HPN=X3) is indicated in the DCI with a CRC (e.g., DCI 215 in FIG. 2) scrambled by the C-RNTI for scheduling the retransmission and NDI is non-toggled between the two DCIs. Since the HPN is specified for a multicast transmission which is different from the HPN used in DCI 211 for unicast transmission, the UE would know that the latter DCI schedules a retransmission of a multicast service, instead of a transmission of a unicast service. By adopting the above embodiments, the HPN collision between a retransmitted multicast TB and a unicast TB can be avoided.

Figure 4:
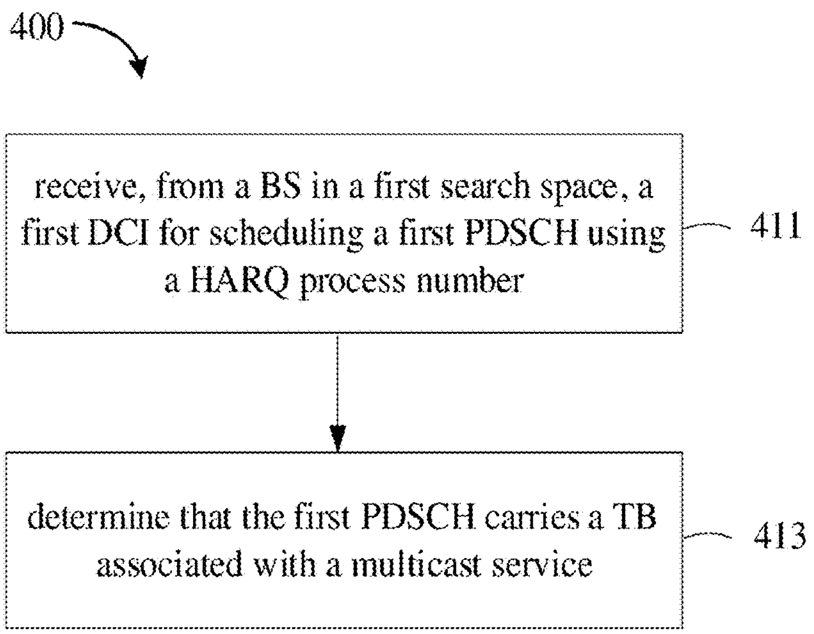
FIGS. 4-7 illustrate a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a UE, for example, UE 101 in FIG. 1.

Referring to FIG. 4, in operation 411, a UE may receive, from a BS in a first search space, a first DCI for scheduling a first PDSCH using a HARQ process number. The CRC of the first DCI may be scrambled by a first RNTI specific to the UE. The first search space may be configured specifically for multicast services. In operation 413, the UE may determine that the first PDSCH carries a TB associated with a multicast service. For example, since the first search space is specifically for multicast services, the UE may determine that the first PDSCH carries a multicast TB.

In some embodiments, the UE may determine that a second DCI transmitted by the BS in the first search space for scheduling a second PDSCH using the HARQ process number is missed by the UE. The CRC of the second DCI may be scrambled by a second RNTI common to a group of UEs including the UE and the second DCI may be transmitted earlier than the first DCI. The UE may determine that the first PDSCH and the second PDSCH carry the same TB. The UE may then decode the first PDSCH.

In some embodiments, the UE may receive, from the BS in the first search space, a second DCI for scheduling a second PDSCH using the HARQ process number. The CRC of the second DCI may be scrambled by a second RNTI common to a group of UEs including the UE. The UE may perform at least one of the following: determining that the first PDSCH and the second PDSCH carry the same TB in response to NDIs of the first DCI and the second DCI being untoggled; or determining an error case in response to NDIs of the first DCI and the second DCI being toggled. In some examples, the UE may decode a soft combination of the first PDSCH and the second PDSCH in response to determining that the first PDSCH and the second PDSCH carry the same TB.

In some embodiments, the UE may receive, from the BS, a third DCI for scheduling a third PDSCH using the HARQ process. The CRC of the third DCI is scrambled by the first RNTI. The UE may perform at least one of the following: (1) determining that the first PDSCH and the third PDSCH carry different TBs in response to the third DCI being received in a second search space different from the first search space; (2) determining that the first PDSCH and the third PDSCH carry different TBs in response to the third DCI being received in the first search space and NDIs of the first DCI and the third DCI being toggled; or (3) determining that the first PDSCH and the third PDSCH carry the same TB in response to the third DCI being received in the first search space and NDIs of the first DCI and the third DCI being untoggled. In some examples, the UE may decode the first PDSCH in response to determining that the first PDSCH and the third PDSCH carry different TBs. In some examples, the UE may decode a soft combination of the first PDSCH and the third PDSCH in response to determining that the first PDSCH and the third PDSCH carry the same TB.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
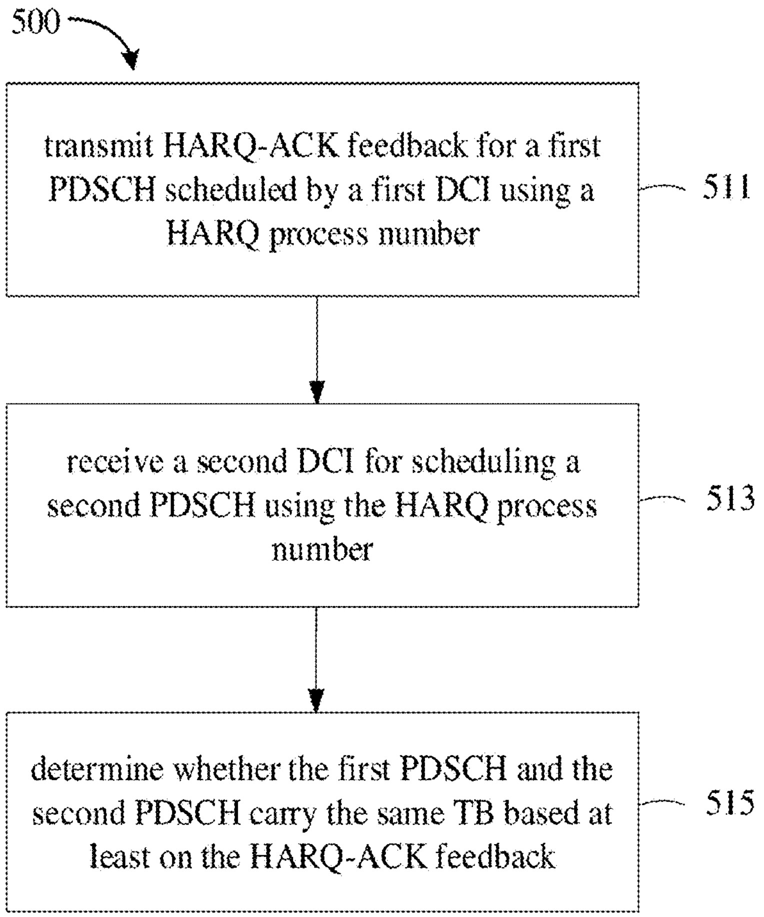

FIG. 5 illustrates a flow chart of an exemplary procedure 500 for wireless communications in accordance with some embodiments of the present disclosure. Details described in all of the foregoing embodiments of the present disclosure are applicable for the embodiments shown in FIG. 5. In some examples, the procedure may be performed by a UE, for example, UE 101 in FIG. 1.

Referring to FIG. 5, in operation 511, a UE may transmit HARQ-ACK feedback for a first PDSCH scheduled by a first DCI using a HARQ process number. The CRC of the first DCI may be scrambled by a first RNTI common to a group of UEs including the UE. The HARQ-ACK feedback may indicate ACK feedback, NACK feedback, or DTX feedback.

In operation 513, the UE may receive a second DCI for scheduling a second PDSCH using the HARQ process number. The CRC of the second DCI may be scrambled by a second RNTI specific to the UE. In operation 515, the UE may determine whether the first PDSCH and the second PDSCH carry the same TB based at least on the HARQ-ACK feedback.

In some embodiments, the UE may receive, prior to the second DCI, a third DCI for scheduling a third PDSCH using the HARQ process number. The CRC of the third DCI may be scrambled by the second RNTI. In some examples, determining whether the first PDSCH and the second PDSCH carry the same TB based at least on the HARQ-ACK feedback may include at least one of the following: in response to the HARQ-ACK feedback for the first PDSCH indicating the DTX feedback and NDIs of the second DCI and the third DCI being toggled, determining that the first PDSCH and the second PDSCH carry the same TB; or in response to the HARQ-ACK feedback for the first PDSCH indicating the DTX feedback and NDIs of the second DCI and the third DCI being untoggled, determining that an error case occurs. In some examples, the UE may, in response to determining that the first PDSCH and the second PDSCH carry the same TB, not perform a soft combination of the second PDSCH and the third PDSCH.

In some embodiments, determining whether the first PDSCH and the second PDSCH carry the same TB based at least on the HARQ-ACK feedback may include at least one of the following: in response to the HARQ-ACK feedback for the first PDSCH indicating the NACK feedback and NDIs of the first DCI and the second DCI being untoggled, determining that the first PDSCH and the second PDSCH carry the same TB; or in response to the HARQ-ACK feedback for the first PDSCH indicating the NACK feedback and NDIs of the first DCI and the second DCI being toggled, determining that an error case occurs. In some examples, the UE may, in response to determining that the first PDSCH and the second PDSCH carry the same TB, perform a soft combination of the first PDSCH and the second PDSCH.

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
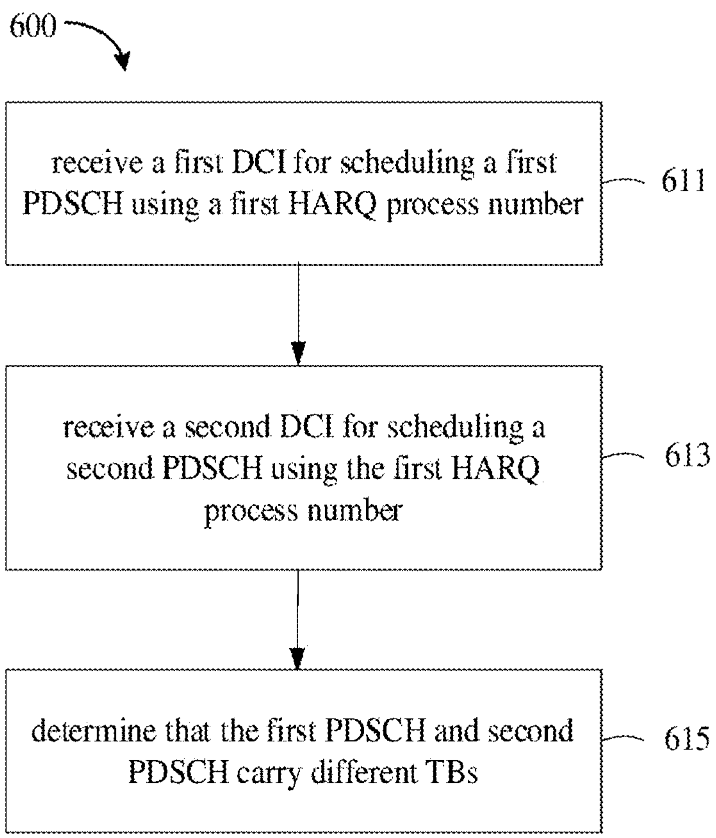

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. In some examples, the procedure may be performed by a UE, for example, UE 101 in FIG. 1.

Referring to FIG. 6, in operation 611, a UE may receive a first DCI for scheduling a first PDSCH using a first HARQ process number. The CRC of the first DCI may be scrambled by a first RNTI common to a group of UEs including the UE.

In operation 613, the UE may receive a second DCI for scheduling a second PDSCH using the first HARQ process number. The CRC of the second DCI may be scrambled by a second RNTI specific to the UE. NDIs of the first DCI and the second DCI may be toggled.

In operation 615, the UE may determine that the first PDSCH and second PDSCH carry different TBs. For example, in response to determining that NDIs of the first DCI and the second DCI are toggled, the UE determines that the first PDSCH and second PDSCH carry different TBs.

In some embodiments, the UE may perform at least one of: (i) storing the first PDSCH in a buffer associated with a second HARQ process number different from the first HARQ process number and decoding the first PDSCH; (ii) storing the second PDSCH in a buffer associated with a second HARQ process number different from the first HARQ process number and decoding the second PDSCH; dropping the first PDSCH; (iii) transmitting NACK feedback for the first PDSCH in response to dropping the first PDSCH; or (iv) decode one of the first PDSCH and the second PDSCH based on the priorities associated with the first PDSCH and the second PDSCH. In some examples, the first DCI and the second DCI may indicate the priorities, e.g., the TBs carried by the first PDSCH and second PDSCH, respectively.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
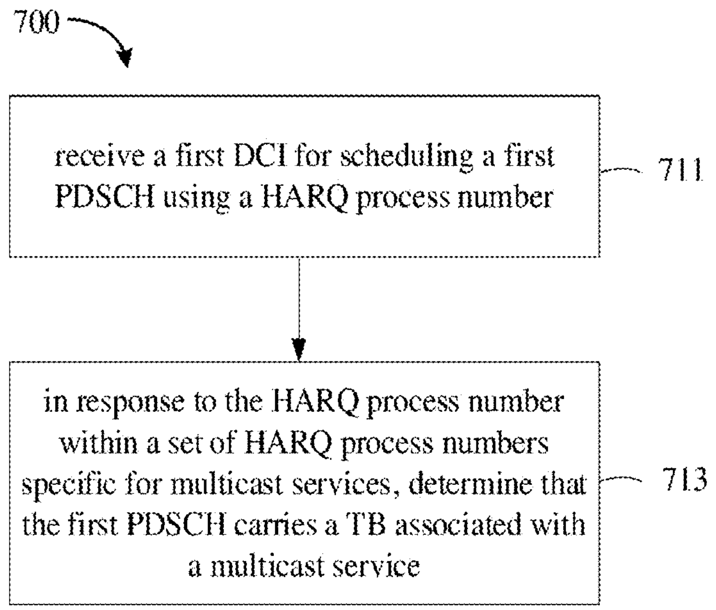

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. In some examples, the procedure may be performed by a UE, for example, UE 101 in FIG. 1.

Referring to FIG. 7, in operation 711, a UE may receive a first DCI for scheduling a first PDSCH using a HARQ process number. The CRC of the first DCI may be scrambled by a first RNTI specific to the UE.

In operation 713, in response to the HARQ process number within a set of HARQ process numbers specific for multicast services, the UE may determine that the first PDSCH carries a TB associated with a multicast service.

In some embodiments, the set of HARQ process numbers may be configured via RRC signaling or predefined. In some embodiments, the UE may be configured with a plurality of HARQ process numbers. The set of HARQ process numbers may be a subset of the plurality of HARQ process numbers.

In some embodiments, the number of bits in the first DCI for indicating the HARQ process number may be based on the number of HARQ process numbers in the plurality of HARQ process numbers. In some embodiments, the number of bits for indicating a HARQ process number in a second DCI with a CRC scrambled by a second RNTI common to a group of UEs including the UE is based on the number of HARQ process numbers in the set of HARQ process numbers.

In some embodiments, the first PDSCH may carry the same TB as a second PDSCH scheduled by a second DCI using the HARQ process number. The CRC of the second DCI may be scrambled by a second RNTI common to a group of UEs including the UE and NDIs of the first DCI and the second DCI are untoggled.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
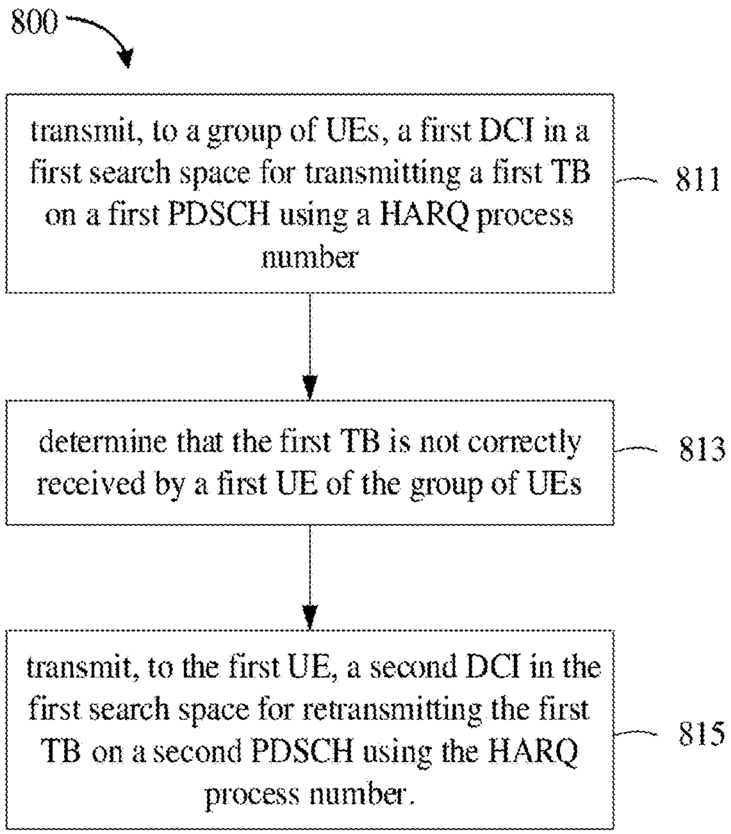
FIGS. 8-12 illustrates a flow chart of an exemplary procedure of wireless communications in accordance with some embodiments of the present disclosure.

FIG. 8 illustrates a flow chart of an exemplary procedure 800 for wireless communications in accordance with some embodiments of the present disclosure. Details described in all of the foregoing embodiments of the present disclosure are applicable for the embodiments shown in FIG. 8. In some examples, the procedure may be performed by a BS, for example, BS 102 in FIG. 1.

Referring to FIG. 8, in operation 811, a BS may transmit, to a group of UEs, a first DCI in a first search space for transmitting a first TB on a first PDSCH using a HARQ process number. The CRC of the first DCI may be scrambled by a first RNTI common to the group of UEs. The first search space may be configured specifically for multicast services and the first TB may be associated with a multicast service.

In operation 813, the BS may determine that the first TB is not correctly received by a first UE of the group of UEs. In operation 815, the BS may transmit, to the first UE, a second DCI in the first search space for retransmitting the first TB on a second PDSCH using the HARQ process number. The CRC of the second DCI may be scrambled by a second RNTI specific to the first UE and NDI in the second DCI may be untoggled compared with an NDI in the first DCI.

In some embodiments, the BS may transmit, to the first UE, a third DCI in a second search space for transmitting a second TB on a third PDSCH using the HARQ process number. The CRC of the third DCI may be scrambled by the second RNTI. The second search space may be configured specifically for the first UE and the second TB may be associated with a unicast service.

In some embodiments, the BS may determine that the second TB is not correctly received by the first UE. The BS may transmit, to the first UE, a fourth DCI in the second search space for retransmitting the second TB on a fourth PDSCH using the HARQ process number. The CRC of the fourth DCI may be scrambled by the second RNTI and NDI in the fourth DCI may be untoggled compared with an NDI in the third DCI.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
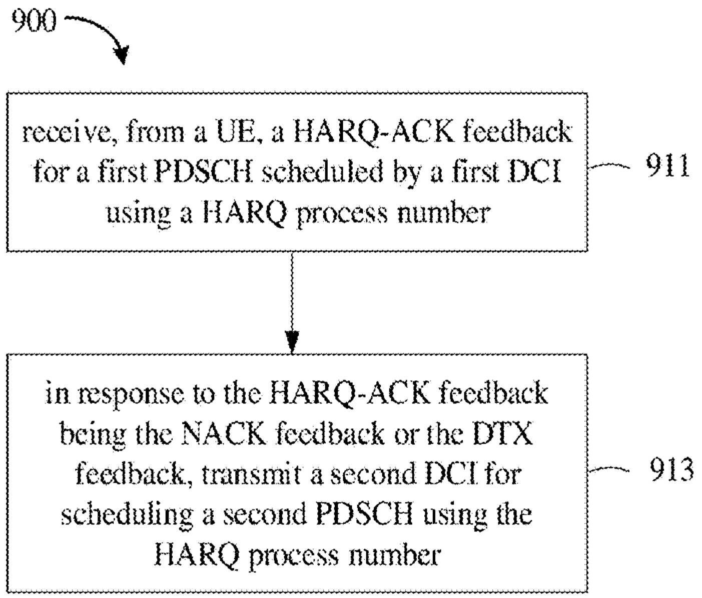

FIG. 9 illustrates a flow chart of an exemplary procedure 900 for wireless communications in accordance with some embodiments of the present disclosure. Details described in all of the foregoing embodiments of the present disclosure are applicable for the embodiments shown in FIG. 9. In some examples, the procedure may be performed by a BS, for example, BS 102 in FIG. 1.

Referring to FIG. 9, in operation 911, a BS may receive, from a UE, a HARQ-ACK feedback for a first PDSCH scheduled by a first DCI using a HARQ process number. The CRC of the first DCI may be scrambled by a first RNTI common to a group of UEs including the UE. The HARQ-ACK feedback may indicate ACK feedback, NACK feedback, or DTX feedback.

In operation 913, in response to the HARQ-ACK feedback being the NACK feedback or the DTX feedback, the BS may transmit a second DCI for scheduling a second PDSCH using the HARQ process number. The CRC of the second DCI may be scrambled by a second RNTI specific to the UE, and the first PDSCH and the second PDSCH may carry the same TB.

In some embodiments, the BS may transmit, prior to the second DCI, a third DCI for scheduling a third PDSCH using the HARQ process number. The CRC of the third DCI may be scrambled by the second RNTI. In response to the HARQ-ACK feedback for the first PDSCH indicating the DTX feedback, the BS may toggle an NDI of the second DCI with respect to an NDI of the third DCI.

In some embodiments, in response to the HARQ-ACK feedback for the first PDSCH indicating the NACK feedback, the BS may untoggle an NDI of the second DCI compared with an NDI of the first DCI.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
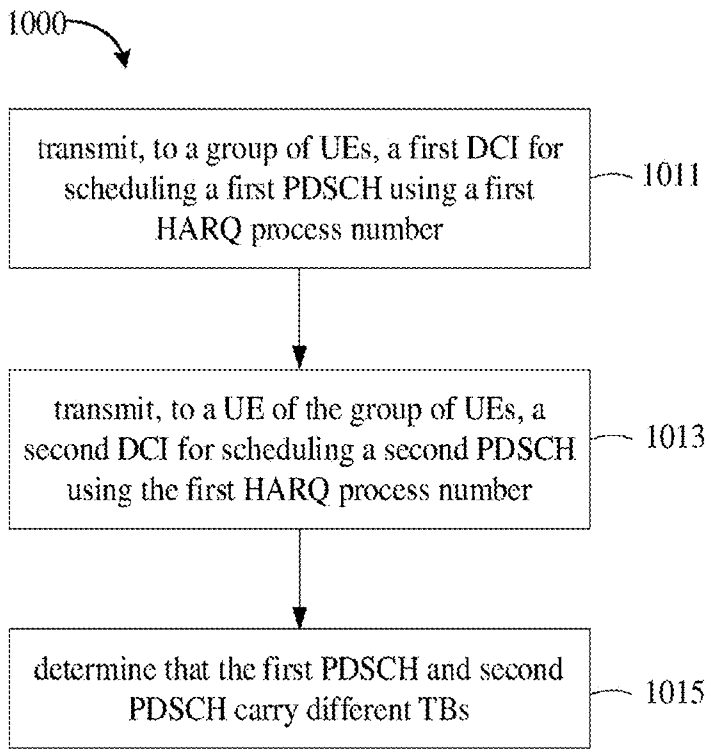

FIG. 10 illustrates a flow chart of an exemplary procedure 1000 for wireless communications in accordance with some embodiments of the present disclosure. Details described in all of the foregoing embodiments of the present disclosure are applicable for the embodiments shown in FIG. 10. In some examples, the procedure may be performed by a BS, for example, BS 102 in FIG. 1.

Referring to FIG. 10, in operation 1011, a BS may transmit, to a group of UEs, a first DCI for scheduling a first PDSCH using a first HARQ process number. The CRC of the first DCI may be scrambled by a first RNTI common to the group of UEs.

In operation 1013, the BS may transmit, to a UE of the group of UEs, a second DCI for scheduling a second PDSCH using the first HARQ process number. The CRC of the second DCI may be scrambled by a second RNTI specific to the UE and NDIs of the first DCI and the second DCI are toggled.

In operation 1015, the BS may determine that the first PDSCH and second PDSCH carry different TBs.

It should be appreciated by persons skilled in the art that the sequence of the operations in exemplary procedure 1000 may be changed and some of the operations in exemplary procedure 1000 may be eliminated or modified, without departing from the spirit and scope of the disclosure. For example, operation 1015 may occur before operation 1013.

Figure 11:
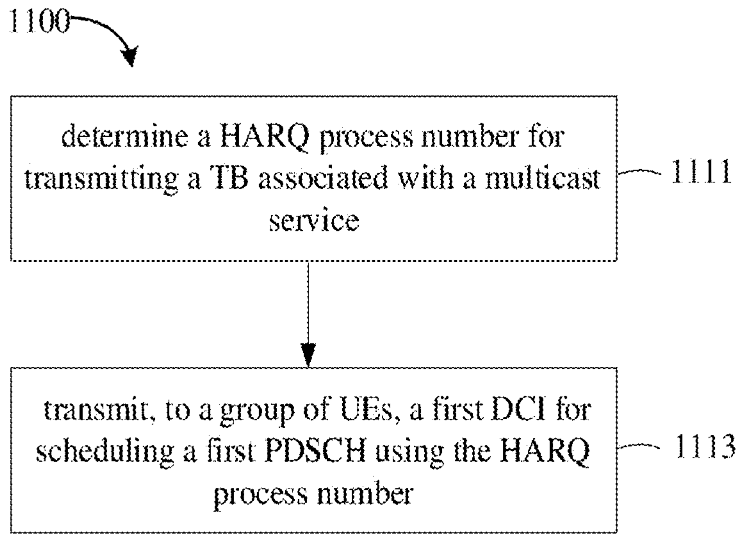

FIG. 11 illustrates a flow chart of an exemplary procedure 1100 for wireless communications in accordance with some embodiments of the present disclosure. Details described in all of the foregoing embodiments of the present disclosure are applicable for the embodiments shown in FIG. 11. In some examples, the procedure may be performed by a BS, for example, BS 102 in FIG. 1.

Referring to FIG. 11, in operation 1111, a BS may determine a HARQ process number for transmitting a TB associated with a multicast service. The HARQ process number may be determined from a set of HARQ process numbers specific for multicast services.

In operation 1113, the BS may transmit, to a group of UEs, a first DCI for scheduling a first PDSCH using the HARQ process number. The CRC of the first DCI may be scrambled by a first RNTI common to the group of UEs.

In some embodiments, the set of HARQ process numbers may be configured to a UE of the group of UEs via RRC signaling or is predefined.

In some embodiments, the BS may configure a plurality of HARQ process numbers to a UE of the group of UEs. The set of HARQ process numbers may be a subset of the plurality of HARQ process numbers.

In some embodiments, the number of bits in the first DCI for indicating the HARQ process number may be based on the number of HARQ process numbers in the set of HARQ process numbers.

In some embodiments, the BS may transmit, to a UE of the group of UEs, a second DCI for scheduling a second PDSCH using the HARQ process number. The CRC of the second DCI may be scrambled by a second RNTI specific to the UE. The BS may set an NDI in the second DCI untoggled compared with an NDI in the first DCI in the case that the second PDSCH carries the same TB as the first PDSCH. In some embodiments, the number of bits for indicating a HARQ process number in the second DCI may be based on the number of HARQ process numbers in the plurality of HARQ process numbers.

It should be appreciated by persons skilled in the art that the sequence of the operations in exemplary procedure 1100 may be changed and some of the operations in exemplary procedure 1100 may be eliminated or modified, without departing from the spirit and scope of the disclosure.

Figure 12:
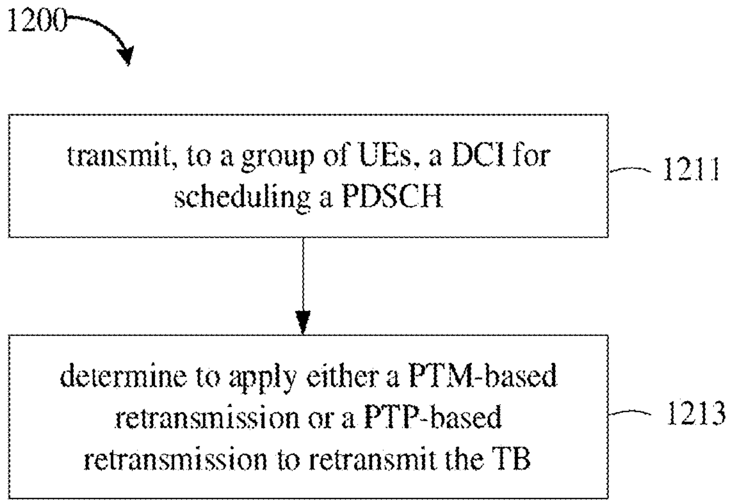

FIG. 12 illustrates a flow chart of an exemplary procedure 1200 for wireless communications in accordance with some embodiments of the present disclosure. Details described in all of the foregoing embodiments of the present disclosure are applicable for the embodiments shown in FIG. 12. In some examples, the procedure may be performed by a BS, for example, BS 102 in FIG. 1.

Referring to FIG. 12, in operation 1211, a BS may transmit, to a group of UEs, a DCI for scheduling a PDSCH. The CRC of the DCI may be scrambled by a RNTI common to the group of UEs and the PDSCH may carry a TB associated with a multicast service.

In operation 1213, the BS may determine to apply either a PTM-based retransmission or a PTP-based retransmission to retransmit the TB.

In some embodiments, the BS may determine to apply the PTM based retransmission to retransmit the TB in response to at least one of the following being met: a transmission time of the DCI being less than or equal to a maximum transmission time; a ratio of the number of UEs in the group of UEs which report NACK feedback to the total number of UEs in the group of UEs exceeding a threshold in the case of UE-specific ACK/NACK feedback for the PDSCH; at least one UE in the group of UEs reporting the NACK feedback in the case of NACK-only feedback for the PDSCH; or at least one UE in the group of UEs having an associated DCI with a CRC scrambled by a UE-specific RNTI which schedules a UE-specific PDSCH and indicates an NDI untoggled compared with an NDI of the DCI.

In some embodiments, the BS may determine to apply the PTP based retransmission to retransmit the TB in response to at least one of the following being met: a transmission time of the DCI being greater than a maximum transmission time; a ratio of the number of UEs in the group of UEs which report NACK feedback to the total number of UEs in the group of UEs not exceeding a threshold in the case of UE-specific ACK/NACK feedback for the PDSCH; or no UE in the group of UEs having an associated DCI with a CRC scrambled by a UE-specific RNTI which schedules a UE-specific PDSCH and indicates an NDI untoggled compared with an NDI of the DCI.

In some embodiments, at least one of the maximum transmission time or the threshold is predefined, or determined by the BS according to a criterion.

It should be appreciated by persons skilled in the art that the sequence of the operations in exemplary procedure 1200 may be changed and some of the operations in exemplary procedure 1200 may be eliminated or modified, without departing from the spirit and scope of the disclosure.

Figure 13:
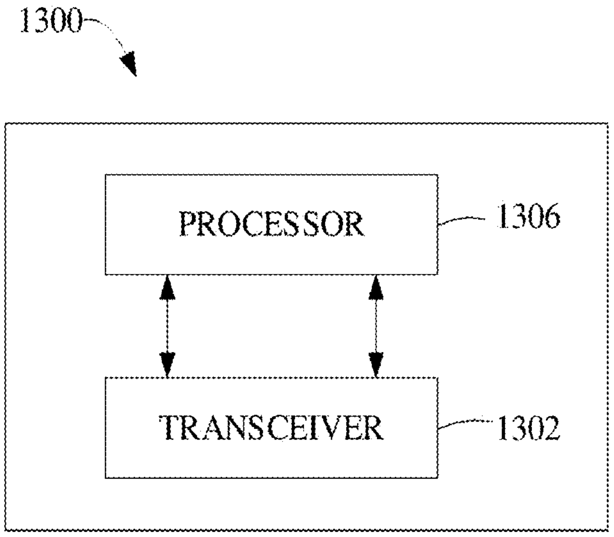
FIG. 13 illustrates a block diagram of an exemplary apparatus in accordance with some embodiments of the present disclosure.

FIG. 13 illustrates a block diagram of an exemplary apparatus 1300 according to some embodiments of the present disclosure. As shown in FIG. 13, the apparatus 1300 may include at least one processor 1306 and at least one transceiver 1302 coupled to the processor 1306. The apparatus 1300 may be a UE or a BS.

Although in this figure, elements such as the at least one transceiver 1302 and processor 1306 are described in the singular, the plural is contemplated unless a limitation to the singular is explicitly stated. In some embodiments of the present application, the transceiver 1302 may be divided into two devices, such as a receiving circuitry and a transmitting circuitry. In some embodiments of the present application, the apparatus 1300 may further include an input device, a memory, and/or other components.

In some embodiments of the present application, the apparatus 1300 may be a UE. The transceiver 1302 and the processor 1306 may interact with each other so as to perform the operations with respect to the UE described in FIGS. 1-12. In some embodiments of the present application, the apparatus 1300 may be a BS. The transceiver 1302 and the processor 1306 may interact with each other so as to perform the operations with respect to the BS described in FIGS. 1-12.

In some embodiments of the present application, the apparatus 1300 may further include at least one non-transitory computer-readable medium.

For example, in some embodiments of the present disclosure, the non-transitory computer-readable medium may have stored thereon computer-executable instructions to cause the processor 1306 to implement the method with respect to the UE as described above. For example, the computer-executable instructions, when executed, cause the processor 1306 interacting with transceiver 1302 to perform the operations with respect to the UE described in FIGS. 1-12.

In some embodiments of the present disclosure, the non-transitory computer-readable medium may have stored thereon computer-executable instructions to cause the processor 1306 to implement the method with respect to the BS as described above. For example, the computer-executable instructions, when executed, cause the processor 1306 interacting with transceiver 1302 to perform the operations with respect to the BS described in FIGS. 1-13.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms “includes,” “including,” or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by “a,” “an,” or the like does not, without more constraints, preclude the existence of additional identical elements in the process, method, article, or apparatus that includes the element. Also, the term “another” is defined as at least a second or more. The term “having” and the like, as used herein, are defined as “including.” Expressions such as “A and/or B” or “at least one of A and B” may include any and all combinations of words enumerated along with the expression. For instance, the expression “A and/or B” or “at least one of A and B” may include A, B, or both A and B. The wording “the first,” “the second” or the like is only used to clearly illustrate the embodiments of the present application, but is not used to limit the substance of the present application.

What is claimed:

1. A user equipment (UE) for wireless communication, comprising:
- at least one memory; and
- at least one processor coupled with the at least one memory and configured to cause the UE to:
  - receive, from a base station (BS) in a first search space, a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE and the first search space is configured specifically for multicast services; and
  - determine that the first PDSCH carries a transport block (TB) associated with a multicast service.

2. The UE of claim 1, wherein the at least one processor is configured to cause the UE to:
- determine that a second DCI transmitted by the BS in the first search space for scheduling a second PDSCH using the HARQ process number is missed by the UE, wherein a CRC of the second DCI is scrambled by a second RNTI common to a group of UEs including the UE and the second DCI is transmitted earlier than the first DCI;
- determine that the first PDSCH and the second PDSCH carry a same TB; and
- decode the first PDSCH.

3. The UE of claim 1, wherein the at least one processor is configured to cause the UE to:
- receive, from the BS in the first search space, a second DCI for scheduling a second PDSCH using the HARQ process number, wherein a CRC of the second DCI is scrambled by a second RNTI common to a group of UEs including the UE; and
- determine at least one of the first PDSCH and the second PDSCH carry a same TB in response to new data indicators (NDIs) of the first DCI and the second DCI being untoggled, or an error case in response to the NDIs of the first DCI and the second DCI being toggled.

4. The UE of claim 3, wherein the at least one processor is configured to cause the UE to decode a soft combination of the first PDSCH and the second PDSCH in response to determining that the first PDSCH and the second PDSCH carry the same TB.

5. The UE of claim 1, wherein the at least one processor is configured to cause the UE to:
- receive, from the BS, a third DCI for scheduling a third PDSCH using the HARQ process, wherein a CRC of the third DCI is scrambled by the first RNTI; and
- determine at least one of:
- the first PDSCH and the third PDSCH carry different TBs in response to the third DCI being received in a second search space different from the first search space;
- the first PDSCH and the third PDSCH carry different TBs in response to the third DCI being received in the first search space and new data indicators (NDIs) of the first DCI and the third DCI being toggled; or
- the first PDSCH and the third PDSCH carry a same TB in response to the third DCI being received in the first search space and the NDIs of the first DCI and the third DCI being untoggled.

6. The UE of claim 5, wherein the at least one processor is configured to cause the UE to:
- decode the first PDSCH in response to determining that the first PDSCH and the third PDSCH carry different TBs; or
- decode a soft combination of the first PDSCH and the third PDSCH in response to determining that the first PDSCH and the third PDSCH carry the same TB.

7. A user equipment (UE) for wireless communication, comprising:
- at least one memory; and
- at least one processor coupled with the at least one memory and configured to cause the UE to:
- receive a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to the UE; and
- in response to the HARQ process number within a set of HARQ process numbers specific for multicast services, determine that the first PDSCH carries a transport block (TB) associated with a multicast service.

8. The UE of claim 7, wherein the set of HARQ process numbers is configured via radio resource control (RRC) signaling or predefined.

9. The UE of claim 7, wherein the UE is configured with a plurality of HARQ process numbers and the set of HARQ process numbers is a subset of the plurality of HARQ process numbers.

10. The UE of claim 9, wherein a number of bits in the first DCI for indicating the HARQ process number is based on the number of HARQ process numbers in the plurality of HARQ process numbers.

11. The UE of claim 9, wherein a number of bits for indicating a HARQ process number in a second DCI with a CRC scrambled by a second RNTI common to a group of UEs including the UE is based on the number of HARQ process numbers in the set of HARQ process numbers.

12. The UE of claim 7, wherein the first PDSCH carries a same TB as a second PDSCH scheduled by a second DCI using the HARQ process number, wherein a CRC of the second DCI is scrambled by a second RNTI common to a group of UEs including the UE and new data indicators (NDIs) of the first DCI and the second DCI are untoggled.

13. A base station (BS) for wireless communication, comprising:

at least one memory; and at least one processor coupled with the at least one memory and configured to cause the BS to:

transmit, to a group of user equipments (UEs), a first downlink control information (DCI) in a first search space for transmitting a first transport block (TB) on a first physical downlink shared channel (PDSCH) using a hybrid automatic repeat request (HARQ) process number, wherein a cyclic redundancy check (CRC) of the first DCI is scrambled by a first radio network temporary identifier (RNTI) common to the group of UEs, and the first search space is configured specifically for multicast services and the first TB is associated with a multicast service;

determine that the first TB is not correctly received by a first UE of the group of UEs; and transmit, to the first UE, a second DCI in the first search space for retransmitting the first TB on a second PDSCH using the HARQ process number, wherein a CRC of the second DCI is scrambled by a second RNTI specific to the first UE and new data indicator (NDI) in the second DCI is untoggled compared with an NDI in the first DCI.

14. The BS of claim 13, wherein the at least one processor is configured to cause the BS to:

transmit, to the first UE, a third DCI in a second search space for transmitting a second TB on a third PDSCH using the HARQ process number, wherein a CRC of the third DCI is scrambled by the second RNTI and the second search space is configured specifically for the first UE and the second TB is associated with a unicast service;

determine that the second TB is not correctly received by the first UE; and transmit, to the first UE, a fourth DCI in the second search space for retransmitting the second TB on a fourth PDSCH using the HARQ process number, wherein a CRC of the fourth DCI is scrambled by the second RNTI and an NDI in the fourth DCI is untoggled compared with an NDI in the third DCI.

15. A processor for wireless communication, comprising:

at least one controller coupled with at least one memory and configured to cause the processor to:

receive, from a base station (BS) in a first search space, a first downlink control information (DCI) for scheduling a first physical downlink shared channel (PDSCH) using a hybrid automatic repeat request (HARQ) process number, wherein a cyclic redundancy check (CRC) of the first DCI is scrambled by a first radio network temporary identifier (RNTI) specific to a user equipment (UE) and the first search space is configured specifically for multicast services; and determine that the first PDSCH carries a transport block (TB) associated with a multicast service.

16. The processor of claim 15, wherein the at least one controller is configured to cause the processor to:

determine that a second DCI transmitted by the BS in the first search space for scheduling a second PDSCH using the HARQ process number is missed by the UE, wherein a CRC of the second DCI is scrambled by a second RNTI common to a group of UEs including the UE and the second DCI is transmitted earlier than the first DCI;

determine that the first PDSCH and the second PDSCH carry a same TB; and decode the first PDSCH.

17. The processor of claim 15, wherein the at least one controller is configured to cause the processor to:

receive, from the BS in the first search space, a second DCI for scheduling a second PDSCH using the HARQ process number, wherein a CRC of the second DCI is scrambled by a second RNTI common to a group of UEs including the UE; and determine at least one of the first PDSCH and the second PDSCH carry a same TB in response to new data indicators (NDIs) of the first DCI and the second DCI being untoggled; or determining untoggled, or an error case in response to the NDIs of the first DCI and the second DCI being toggled.

18. The processor of claim 17, wherein the at least one controller is configured to cause the processor to decode a soft combination of the first PDSCH and the second PDSCH in response to determining that the first PDSCH and the second PDSCH carry the same TB.

19. The processor of claim 15, wherein the at least one controller is configured to cause the processor to:

receive, from the BS, a third DCI for scheduling a third PDSCH using the HARQ process, wherein a CRC of the third DCI is scrambled by the first RNTI; and determine at least one of:

the first PDSCH and the third PDSCH carry different TBs in response to the third DCI being received in a second search space different from the first search space;

the first PDSCH and the third PDSCH carry different TBs in response to the third DCI being received in the first search space and new data indicators (NDIs) of the first DCI and the third DCI being toggled; or the first PDSCH and the third PDSCH carry a same TB in response to the third DCI being received in the first search space and the NDIs of the first DCI and the third DCI being untoggled.

20. The processor of claim 19, wherein the at least one controller is configured to cause the processor to:

decode the first PDSCH in response to determining that the first PDSCH and the third PDSCH carry different TBs; or decode a soft combination of the first PDSCH and the third PDSCH in response to determining that the first PDSCH and the third PDSCH carry the same TB.

* * * * *